United States Patent [19]

Moore

[11] Patent Number: 5,276,287
[45] Date of Patent: Jan. 4, 1994

[54] ADD-ON VEHICLE HORN BUTTON ACTUATOR

[76] Inventor: John L. Moore, 5104 Fairglen La., Chevy Chase, Md. 20815

[21] Appl. No.: 48,007

[22] Filed: Apr. 19, 1993

[51] Int. Cl.⁵ .............................................. H01H 3/20
[52] U.S. Cl. ..................................... 200/331; 200/330
[58] Field of Search ............... 200/61.54, 61.55, 61.56, 200/61.57, 329, 330, 332, 334, 331, 333

[56] References Cited

U.S. PATENT DOCUMENTS

| | | | |
|---|---|---|---|
| 2,584,883 | 2/1952 | Karsch | 200/333 |
| 3,517,145 | 6/1970 | Wallace | 200/61.57 |
| 4,004,114 | 1/1977 | Baduel | 200/61.56 |
| 4,447,684 | 5/1984 | Sugiyama | 200/61.54 |
| 5,219,415 | 6/1993 | Weinstein | 200/61.54 |

FOREIGN PATENT DOCUMENTS 0060241 12/1891 Fed. Rep. of Germany ...... 200/331
0610698 9/1926 France .............................. 200/61.57

*Primary Examiner*—William A. Cuchlinski, Jr.
*Assistant Examiner*—Willie Morris Worth
*Attorney, Agent, or Firm*—H. Jay Spiegel

[57] ABSTRACT

An add-on vehicle horn button actuator is mounted on an existing steering wheel over a portion of the periphery of its wheel portion with a generally triangularly shaped surface extending inwardly in overlying relation to the horn button of the steering wheel. A screw depending downwardly from the triangularly shaped surface is adjustable within an elongated slot on the triangularly shaped surface to accommodate to horn buttons having differing locations. When the triangularly shaped surface of the actuator is slapped or otherwise struck by the user, the screw engages the horn button and depresses it thereby actuating the vehicle horn.

8 Claims, 2 Drawing Sheets

ADD-ON VEHICLE HORN BUTTON ACTUATOR

BACKGROUND OF THE INVENTION

For many years, vehicle horns have been actuated by virtue of an actuator mounted on a vehicle steering wheel. In some cases, these actuators have comprised a metallic ring concentric with the wheel portion of a steering wheel, which ring when engaged at any point along its periphery causes horn actuation. Additionally, some horn actuators have comprised a central enlarged circular portion aligned with the steering wheel support column and engageable by the user at any location thereon to cause switch closure and horn actuation.

With the advent of the "air bag" passenger restraint system, on vehicles with such "air bags", it is not possible to maintain a horn actuator in alignment with the steering wheel support column since the "air bag" housing is located there. For whatever reasons, automobile manufacturers have generally ceased to manufacture metallic rings concentric with the wheel portion of steering wheels thereby further limiting options.

As "air bag" passenger restraint systems have evolved, vehicle horn actuators have also evolved to become smaller and smaller as time goes by. On many vehicles, the horn actuator consists of one or more small buttons located between the center of the steering wheel and the peripheral wheel thereof on radially extending spokes connecting the central portion containing the "air bag" with the peripheral wheel. Such buttons are quite disadvantageous for several reasons. Firstly, as compared to concentric rings and centrally located actuator pads, which may be slapped to actuate the horn, the new horn actuator buttons are not effective to actuate the horn when slapped. They must be deliberately pushed to actuate the vehicle horn. Secondly, because of their small size, they are not easy to locate on the steering wheel assembly. Thus, the driver must take his or her eyes off the road to facilitate finding the horn button whereupon the horn button may be pushed to actuate the vehicle horn. Since the horn is only actuated under emergency conditions, it is extremely dangerous to manufacture a vehicle with a horn button which is so small that the driver must take his or her eyes off the road to find it.

It is with these concerns in mind that the present invention was developed.

SUMMARY OF THE INVENTION

The present invention relates to an add-on vehicle horn button actuator. The present invention includes the following interrelated objects, aspects and features:

(A) In a first aspect, the present invention is intended for use in conjunction with a vehicle steering wheel having a central area containing a passenger restraint known as an "air bag". Such steering wheels commonly have horn actuator buttons on the spokes connecting the central "air bag" containing region with the peripheral wheel.

(B) The present invention consists of an attachment designed to be clamped over the peripheral wheel portion of the steering wheel and including a triangularly shaped portion extending in a direction toward the center of the steering wheel and in overlying relation to one of the horn actuator buttons of the steering wheel.

(C) The triangularly shaped portion has an elongated slot receiving a screw with the screw carrying a nut and lock washer allowing the position of the screw to be adjusted along the slot. The slot is provided to facilitate adjustment of the inventive device for horn actuator buttons located in differing locations on a steering wheel spoke.

(D) In addition, a tension adjustment screw may be provided on the triangularly shaped portion to allow adjustment of the location of the end of the horn button actuating screw with respect to the horn actuator button.

(E) In operation, when it is desired to actuate the vehicle horn, one need only slap the triangularly shaped portion thereby causing the horn button actuating screw to engage and depress the horn button to activate the vehicle horn.

As such, it is a first object of the present invention to provide an add-on vehicle horn button actuator.

It is a further object of the present invention to provide such a device including a triangularly shaped portion designed to be mounted in overlying relation to a spoke of an existing vehicle steering wheel.

It is a still further object of the present invention to provide such a device with means for adjusting the tension thereof.

It is a still further object of the present invention to provide such a device with a slot allowing radial adjustment of the position of the horn button actuating screw.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
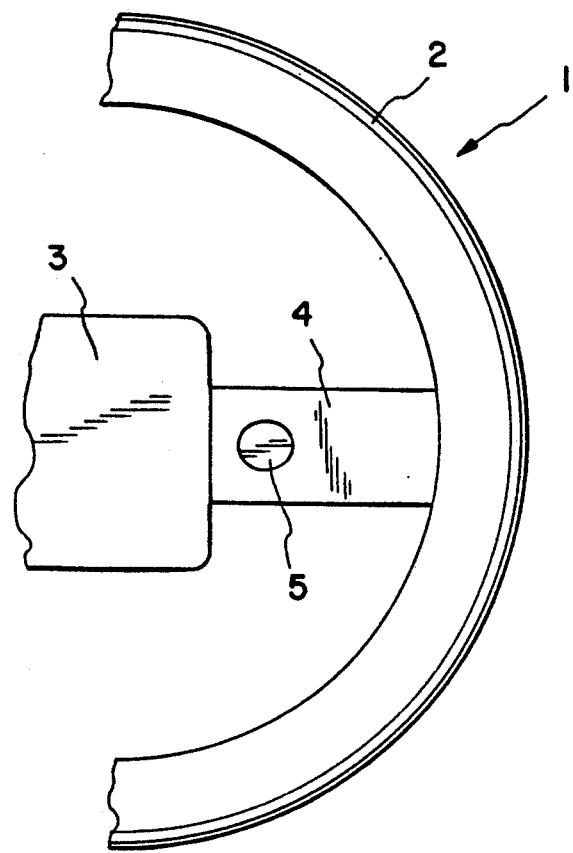
FIG. 1 shows a top view of a portion of an existing vehicle steering wheel showing the location of the "air bag", peripheral wheel and horn button actuator thereof.

With reference, first, to FIG. 1, a steering wheel is generally designated by the reference numeral 1 and is seen to include a peripheral wheel 2, a central portion 3 having a chamber (not shown) containing a passenger restraint known as an "air bag" and a spoke 4 interconnecting the central portion 3 with the peripheral wheel 2. As should be understood, several spokes 4 are provided in any typical steering wheel. As also shown in FIG. 1, a horn actuator button 5 is located on the spoke 4 between the central portion 3 and the peripheral wheel 2. As should also be understood, in many vehicle steering wheels, each spoke 4 is provided with a horn actuator button 5. When a such button 5 is depressed, a switch (not shown) is closed resulting in horn actuation.

Figure 2:
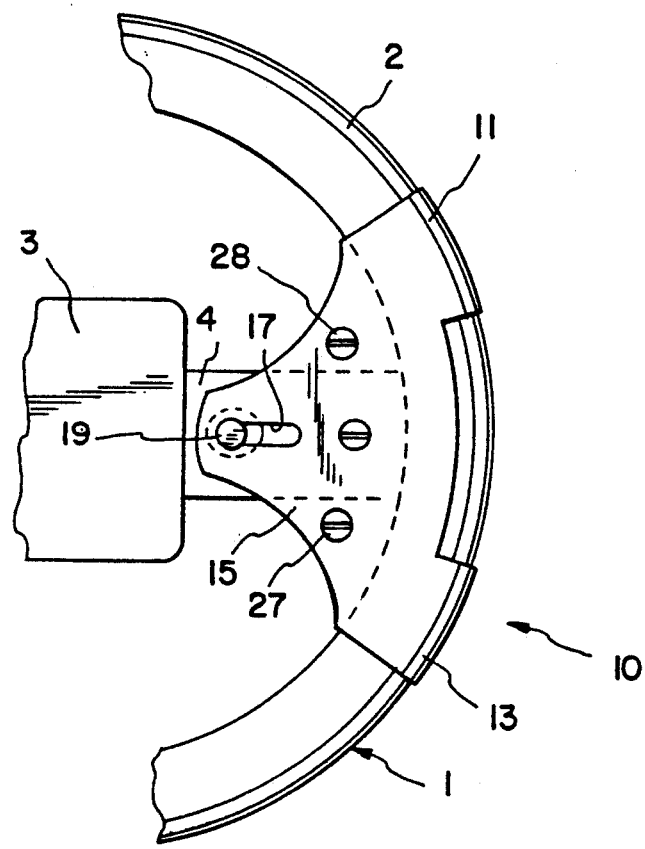
FIG. 2 shows a top view of the existing steering wheel, similar to the view of FIG. 1 but showing the present invention mounted thereon.

With reference to FIG. 2, the present invention is generally designated by the reference numeral 10 and is seen to include mounting means comprising attaching bands 11, 13 as well as a triangularly shaped portion 15 comprising a striking pad. The triangularly shaped portion 15 has an elongated slot 17 extending radially along the spoke 4, as mounted.

Figure 3:
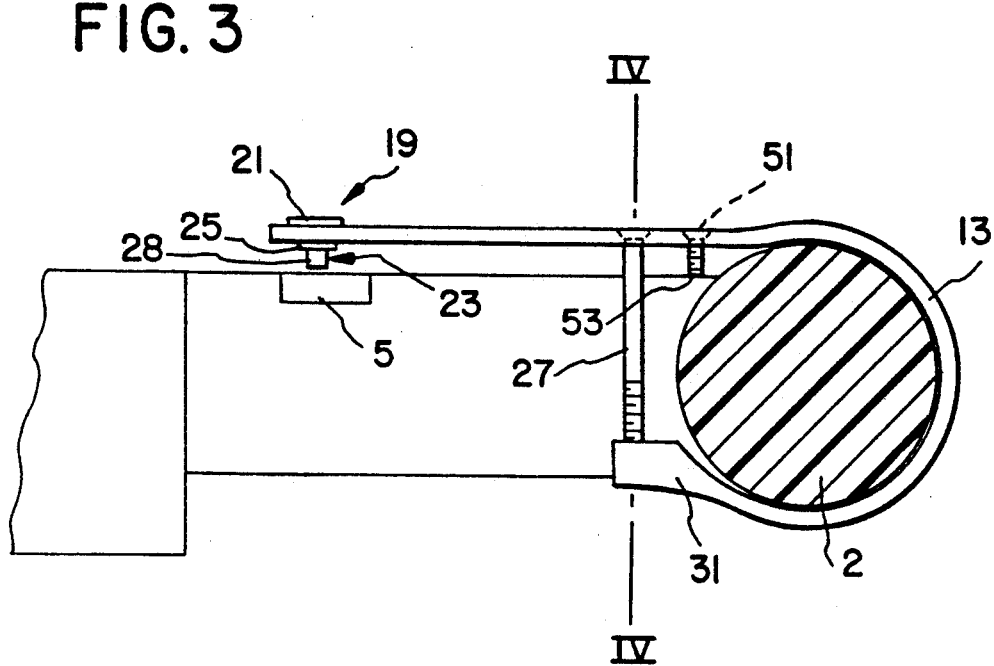
FIG. 3 shows a cross-sectional view through the inventive device.

Within the slot 17, a horn button actuating protrusion in the form of the screw 19 is mounted. With particular reference to FIG. 3, it is seen that the screw 19 has a head 21 as well as a depending elongated threaded portion 23 having an end 28. A combination nut and lock washer 25 are threaded over the portion 23 of the screw 19 and the lock washer portion thereof engages an undersurface of the triangularly shaped portion 15 to lock the location of the screw 19 in a particular desired location along the slot 17 with the portion 23 of the screw 19 in overlying relation to the horn actuator button 5 of the steering wheel assembly 1. As shown in FIG. 3, the end 28 of the portion 23 of the screw 19 is slightly spaced from a top surface of the horn actuator button 5.

The cross-sectional view of FIG. 3 particularly shows the band 13 of the device 10 and is representative of the details of the band 11, as well. The band 13 is seen to extend about the peripheral wheel 2 of the steering wheel assembly 1 with mounting screw 27 extending from the triangularly shaped portion 15 downwardly to a mounting location 31. As shown, in particular, in FIG. 4, the screw 27 may have a head 35 recessed within a recess 36 formed within the triangularly shaped portion 15 of the device 10 with the stem 37 thereof extending to the mounting location 31. The mounting location 31 includes an undersurface 41 with a recess 43 in which is embedded a nut 45 having a threaded opening therethrough designed to threadably receive the threaded stem 37 of the screw 27. The nut 45 is embedded within the recess 43 so that it may not turn. Thus, rotation of the screw 27 using a suitable screwdriver (not shown) will result in advancing of the stem portion 37 thereof through the opening in the nut 45 thereby tightening the attaching band 13 in clamped relation over the peripheral wheel 2. The screw 28 is similarly operable in cooperation with corresponding structure to tighten the attaching band 11 over the peripheral wheel 2.

In a further aspect, with the inventive device 10 clamped over the steering wheel as explained above, and with the location of the horn button actuating screw 19 having been adjusted along the slot 17, it is possible that the end 28 of the depending portion 23 of the screw 19 may engage the surface of the horn button 5 and may, in fact, slightly depress the horn button 5. Under such circumstances, the tension adjustment means comprising the screw 51 may be employed to alleviate this problem. Thus, the tension adjustment screw 51 is threadably received within a threaded opening formed in the triangularly shaped portion 15 of the inventive device 10. The screw 51 may be threaded through the opening in the triangularly shaped portion 15 until the end 53 thereof engages the surface of the spoke 4 of the steering wheel assembly 1 whereupon further threading of the screw 51 through the threaded opening in the triangularly shaped portion 15 will cause slight warping of the triangularly shaped portion 15 thereby slightly lifting the depending portion 23 of the screw 19. The screw 51 may be advanced until such time as the end 28 of the depending portion 23 of the screw 19 is slightly spaced from the surface of the horn button 5.

With the present invention having been described in detail, the preferred mode of operation will now be explained.

Firstly, the inventive device 10 is attached over the existing steering wheel by placing the attaching bands 11, 13 over the peripheral wheel 2 thereof. In the preferred embodiment of the present invention, the attaching bands 11 and 13 are thin enough to permit them to flex to a degree allowing them to be forced over the steering wheel. For example, if the inventive device 10 is made of a molded plastic material, the bands 11 and 13 are made thinner than other portions of the device 10 to permit such flexing.

Figure 4:
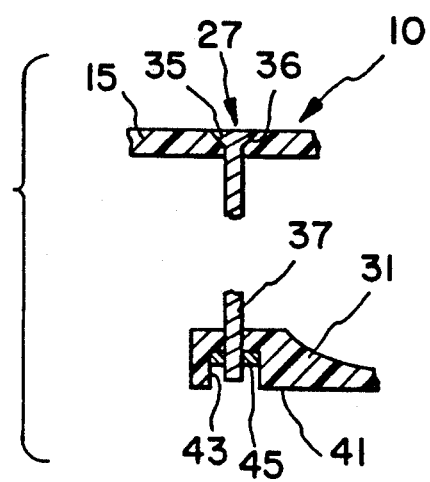
FIG. 4 shows a further cross-sectional view along the line IV—IV of FIG. 3.

With the bands 11 so located over the peripheral wheel 2, the screws 27, 28 are inserted through the top surface of the triangularly shaped portion 15 and are advanced through the nuts, for example, the nut 45 best seen in FIG. 4, to tighten the bands 11, 13 over the peripheral wheel 2 of the steering wheel assembly 1. The position of the screw 19 with respect to the slot 17 is adjusted by loosening the nut and lock washer combination 25, sliding the screw 19 to the appropriate location along the slot 17 and then retightening the nut and lock washer combination 25. If, for any reason, the end 28 of the depending portion 23 of the screw 19 engages or otherwise depresses the horn button 5, the tension adjustment screw 51 may be advanced through the threaded opening in the triangularly shaped portion 15 through which it is received until the end 53 thereof engages the spoke 4, with further advancement of the screw 51 causing flexing of the triangularly shaped portion 15 to alleviate the pressure of the end 28 of the depending portion 23 of the screw 19 on the horn button 5. Optimally, the horn button screw actuator 19 is either slightly spaced from the surface of the horn button 5 or lightly engages it.

With installment and adjustment of the inventive device 10 having been accomplished, when it is desired to activate the vehicle horn (not shown), it is only necessary to slap the triangularly shaped portion 15 so that the end of the depending portion 23 of the screw 19 engages and depresses the horn button 5 thereby activating the horn. In this way, especially provided that the triangularly shaped portion 15 is made in a bright, easily recognizable color, one may utilize one's peripheral vision to locate the triangularly shaped portion 15 without taking one's eyes off the road. In this way, the vehicle horn may be safely and effectively actuated in a reproducible manner without increasing danger to the driver and passengers as would be the case were the driver to be required to avert his or her glance from the road to locate the horn actuating button.

As explained above, in the preferred embodiment, the inventive device 10 may be made of any suitable plastic material which is resilient enough to permit attachment of the attaching bands 11 and 13 over the peripheral wheel 2 while maintaining sufficient rigidity of the triangularly shaped portion 15 to permit transfer of force imposed thereon onto the screw 19 to permit actuation of the horn actuating button 5 and thereby activation of the vehicle horn.

As such, an invention has been disclosed in terms of a preferred embodiment thereof which fulfills each and every one of the objects of the present invention as set forth hereinabove and provides a new and useful add-on vehicle horn button actuator of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. In a vehicle steering wheel having a central portion, a peripheral wheel, at least one spoke interconnecting said central portion and said peripheral wheel, and a horn actuator button for actuating a vehicle horn, the improvement comprising an add-on horn actuator button actuator comprising:
   a) mounting means comprising at least one strap clamped over said peripheral wheel for mounting said add-on horn actuator button actuator on said vehicle steering wheel;
   b) said add-on horn actuator button actuator having a striking pad integral with said strap and extending therefrom, a distal end of said striking pad being sized to completely cover said horn actuator button and to cover portions of said vehicle steering wheel surrounding said horn actuator button to thereby provide an enlarged striking surface, said striking pad being adapted to be struck by a user and having an undersurface having a protrusion alignable above and engageable with said horn actuator button;
   c) whereby, with said protrusion aligned above said horn actuator button, striking of said striking surface causes said protrusion to descend and engage and depress said horn actuator button thereby actuating said vehicle horn.

2. The invention of claim 1, wherein said horn actuator button is located on said at least one spoke.

3. The invention of claim 1, wherein said at least one strap comprises two straps, each of said straps being clamped over said peripheral wheel.

4. The invention of claim 1, wherein said striking pad is generally triangular in shape.

5. The invention of claim 1, wherein said protrusion comprises a screw extending through an opening in said striking pad.

6. The invention of claim 5, wherein said opening comprises an elongated slot, said screw carrying a locking nut allowing said screw to be clamped at a desired position along said slot in alignment with said horn actuator button.

7. The invention of claim 1, wherein said striking pad includes tension adjustment means for adjusting position of an end of said protrusion with respect to an outer surface of said horn actuator button.

8. The invention of claim 7, wherein said tension adjustment means comprises a screw threadably received through a threaded opening in said striking pad, said screw having an end engageable with a said spoke whereby engagement of said screw with said spoke causes adjustment of spacing between said end of said protrusion and said outer surface of said horn actuator button.

* * * * *